United States Patent
Bowler et al.

[11] 3,817,585
[45] June 18, 1974

[54] ANTI-LOCK BRAKE SYSTEM

[75] Inventors: Lauren L. Bowler, Bloomfield; Laird E. Johnston, Birmingham, both of Mich.

[73] Assignee: General Motors Corporation, Detroit, Mich.

[22] Filed: Oct. 30, 1972

[21] Appl. No.: 302,024

[52] U.S. Cl. ........ 303/21 F, 188/181 A, 303/21 B, 303/24 B
[51] Int. Cl. ............................................. B60t 8/12
[58] Field of Search ........ 303/21, 21 R, 21 F, 21 B, 303/24 B; 188/181, 181 A, 181 R

[56] References Cited
UNITED STATES PATENTS

| | | | |
|---|---|---|---|
| 2,869,687 | 1/1959 | Keim et al. | 303/21 F |
| 3,495,881 | 2/1970 | Harned et al. | 303/21 F |
| 3,588,191 | 6/1971 | Atkin et al. | 303/21 F |
| 3,588,193 | 6/1971 | Drutchas | 303/21 F |

*Primary Examiner*—Milton Buchler
*Assistant Examiner*—Paul E. Sauberer
*Attorney, Agent, or Firm*—Herbert Furman

[57] ABSTRACT

An extremal anti-lock brake system utilizes automatic transmission governor pressure as the average rear wheel speed input signal. An accumulator receives fluid from the governor at a flow rate proportional to wheel acceleration and stores fluid proportional in volume and pressure to the wheel speed. Return of fluid from the accumulator to the governor during wheel deceleration is through a deceleration orifice. During wheel deceleration at rates indicative of impending wheel lock, the orifice restricts the discharge flow and provides a pressure differential equivalent to the difference between actual and predetermined maximum wheel velocities during braking under optimum conditions. This pressure differential operates a control valve which exhausts the supporting pressure from a conventional brake pressure modulator to release the brakes. A period of wheel acceleration follows the brake release and during the resulting wheel speed recovery the accumulator is recharged and the control valve shifts to reapply pressure to the modulator. An acceleration valve senses the wheel speed recovery permitted by the brake release and closes a hold valve which isolates the brake pressure modulator from the control valve to maintain the modulator supporting pressure and its then existing magnitude to provide the hold mode of the extremal cycle. When the wheel speed recovery ends the acceleration valve and hold valve are shifted and the support pressure is reapplied to the modulator to initiate the brake apply mode of the extremal cycle.

4 Claims, 4 Drawing Figures

ANTI-LOCK BRAKE SYSTEM

The invention relates to an anti-lock brake system and more particularly to an extremal or peak seeking hydraulic anti-lock brake control system.

It is well known that the brake torque which can be supported by the tire-to-road friction peaks at a certain wheel slip ratio and that this brake torque sustaining capacity decreases as the wheel slip ratio increases from the peak value. It has therefore been found desirable to cycle the brake apply pressure and accordingly the brake torque in accordance with conditions existing at the tire and road interface so that the wheel is not permitted to be decelerated beyond a rate which would result in such an increase in wheel slip as to substantially lessen the retarding force or torque exerted between the tire and the road surface.

It is known to provide a peak seeking or extremal type control system in which a brake pressure sufficient to cause substantially increasing wheel slip is released to permit wheel acceleration and consequent decreasing wheel slip. The brake apply pressure is then held at a value permitting wheel acceleration and continued decrease in wheel slip while maintaining some brake torque on the wheel until the acceleration ceases. The brake apply pressure is then again increased to cause wheel deceleration. This cycle is repeated as necessary to continuously seek out the wheel slip ratio which provides optimum tire-to-road friction.

U.S. Pat. No. 3,441,320 by D. M. Flory utilizes a rotary inertia weight to sense positive and negative wheel accelerations and position control valves which in turn control differential pressures acting on a brake pressure modulator to release, hold, and reapply the vehicle brakes.

U.S. Pat. No. 3,554,612, by J. L. Harned utilizes an electronic control system which compares a wheel acceleration signal to a variable reference signal and operates a brake pressure modulator to release, hold, and reapply the wheel brakes and thereby maintain optimum braking torque.

The present invention provides an anti-lock control system of the extremal type consisting wholly of hydraulically controlled and operated components and utilizing the transmission governor as a wheel velocity and acceleration sensor.

The invention utilizes the output of an automatic transmission governor as the sole input signal. The transmission governor is of the type having a multistage pressure versus speed characteristic so as to provide a nearly linear relationship between wheel speed and the governor output fluid pressure, and between wheel acceleration and fluid flow rate through the governor. The governor output pressure or wheel speed pressure signal charges an accumulator which stores therein a volume of fluid at the governor pressure. When the wheels decelerate during braking, fluid is returned to the governor from the accumulator through a deceleration orifice. The orifice is sized to permit flow therethrough at a rate which slightly exceeds the flow rate equivalent to the rate of decrease of governor pressure during optimum vehicle braking under optimum wheel-to-road interface conditions. When the vehicle wheels decelerate at a rate in excess of this known optimum rate, a pressure differential results across the deceleration orifice. This pressure differential between the reference pressure in the accumulator and the governor pressure is applied across a control valve which is shifted by the pressure differential to an extent linearly proportional to the pressure differential. Shifting of the control valve exhausts the supporting pressure from a conventional brake pressure modulator to initiate the brake pressure release mode of the extremal anti-lock cycle. A period of wheel acceleration follows the brake pressure release and during the resulting wheel speed recovery the accumulator is recharged. An acceleration valve senses the wheel speed recovery permitted by the brake release and closes a hold valve which isolates the brake pressure modulator from the control valve to maintain the modulator supporting pressure at its then existing magnitude and provide the hold mode of the extremal cycle. Upon recharging of the accumulator the differential between accumulator and governor pressure is decreased and a spring shifts the control valve to re-apply support pressure to the modulator. As the wheel speed recovers to near that of the vehicle the acceleration of the wheel is slowed and the acceleration valve shifts and opens the hold valve so that the control valve is communicated to the brake pressure modulator to initiate the reapplication of brake pressure to the wheel brakes. This extremal release, hold and re-apply cycle is repeated until the vehicle is brought to a stop, or the excessive brake application is relieved.

Figure 1:
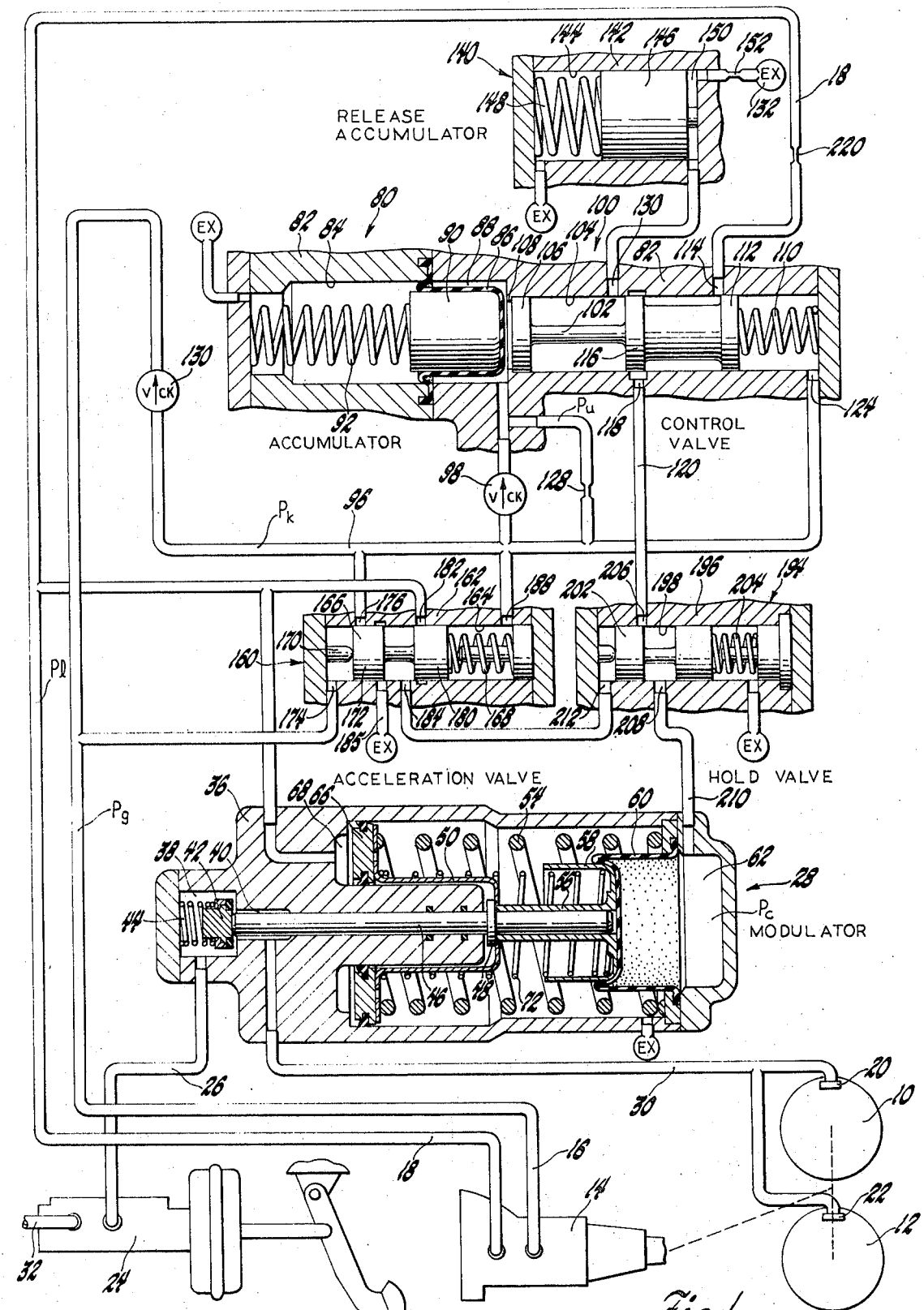
FIG. 1 is a schematic illustration of a vehicle brake system embodying the invention and having parts broken away and in section.

With reference to FIG. 1, a motor vehicle includes rear wheels 10 and 12 connected in a conventional manner to the output shaft of an automatic transmission 14. The transmission 14 includes a transmission governor connected to the output shaft so as to be driven at the average speed of the rear wheels and thereby provide in conduit 16 a fluid pressure signal proportional to the average speed of wheels 10 and 12. The transmission governor is of the type disclosed in co-pending patent application, Ser. No. 185,086, now U.S. Pat. No. 3,718,377, having a two stage pressure versus speed characteristic so as to provide a nearly linear relationship between wheel speed and governor pressure. The governor output pressure or average wheel speed pressure signal in conduit 16 is hereinafter referred to as Pg. The automatic transmission 14 also includes a pump connected to the input shaft of the transmission and providing a fluid pressure in the conduit 18 hereinafter referred to as P1.

The brake system includes conventional wheel brakes 20 and 22 respectively associated with the rear wheels 10 and 12, and additional conventional wheel brakes associated with the front wheels of the vehicle which are not shown. A conventional power boosted master cylinder 24 is connected through conduit 26, brake pressure modulator 28 and conduit 30 to the rear wheel brakes 20 and 22. A conduit 32 connects the master cylinder with the front wheel brakes.

In general, the hydraulic brake anti-lock system of this invention includes an accumulator 80 which stores a volume of fluid at a pressure proportional to average wheel speed; a deceleration orifice 128 through which oil is returned from the accumulator to the governor during wheel deceleration at a maximum rate corresponding to the known maximum rate of wheel deceleration without wheel lock-up; a control valve 100 which moves in linear proportion to the differential between governor and accumulator pressure and in so moving varies the control pressure to the brake pressure modulator 28; a hold valve 194 which closes to isolate the brake pressure modulator 28 from the control valve 100 to provide the hold mode of the anti-lock cycle; and an acceleration valve 160 which closes the hold valve 194 when the wheel is accelerating and opens the hold valve 194 when the wheel is decelerating.

BRAKE PRESSURE MODULATOR

A conventional brake pressure modulator 28 includes a housing 36 forming a valve chamber 38 connected to conduit 26 and an outlet chamber 40 connected to conduit 30. A modulator valve 42, which also acts as a check valve, is located in valve chamber 38 and is biased by spring 44 into closure of outlet chamber 40. A plunger 46 is sealingly slidable in housing 36 and forms a movable wall of the outlet chamber 40. A collar 48 attached to plunger 46 is engaged by a flanged cup 50 which is in turn urged to its leftward most position as shown in FIG. 1 by a spring 54. Plunger 46 is thereby carried to its full leftward position wherein the end thereof in outlet chamber 40 engages modulator valve 42 holding it unseated against the bias of spring 44 to provide free fluid communication between the master cylinder 24 and wheel brakes 20 and 22. Spring 54 is of adequate strength to resist movement of plunger 46 by the brake pressure acting on the end thereof in outlet chamber 40. The collar 48 of plunger 46 is also engaged by a sleeve 56 of a cup 58 which supports a diaphragm 60 defining a chamber 62. A modulator control pressure, hereinafter referred to as Pc, within chamber 62 acts upon diaphragm 60 and through cup 58 and sleeve 56 to urge plunger 46 to its leftward most position of FIG. 1 independently of the force of spring 54. The flanged cup 50 is engaged by an annular piston 66 which forms a chamber 68 with housing 36. Chamber 68 is connected to the transmission pump by conduit 18 so that P1 communicated thereto holds piston 66 and flanged retaining cup 50 rightwardly against the bias of spring 54 to permit movement of plunger 46 in response to variations of Pc within chamber 62. When Pc in chamber 62 is decreased, the combined effort of a spring 72 acting on cup 58 and the brake pressure within outlet chamber 40 acting on the end of plunger 46 will move the plunger 46 rightwardly, thereby allowing spring 44 to seat the modulator valve 42 to interrupt communication of brake pressure from master cylinder 24 to the wheel brakes 20 and 22. A further decrease in Pc permits further rightward movement of plunger 46 and consequent reduction of brake pressure in outlet chamber 40 and conduit 30 to relieve the brake pressure at the wheel brakes 20 and 22. Subsequent increase in Pc will move plunger 46 leftwardly to increase pressure in outlet chamber 40 and then unseat modulator valve 42 to restore free fluid communication between the master cylinder 24 and wheel brakes 20 and 22. Thus it is seen that a conventional brake pressure modulator 28 is provided which overrides operator control of the wheel brakes and provides a brake pressure at the wheel brake which is a function of the modulator control pressure Pc communicated to the chamber 62.

ACCUMULATOR AND DECELERATION ORIFICE

The accumulator 80 includes a housing 82 having a bore 84 therein. A diaphragm 86 has its periphery engaged in the housing 82 and forms therewith an accumulator chamber 88. A piston 90 supports the central portion of diaphragm 86 and is biased to its rightward position shown in FIG. 1 by a spring 92. The wheel velocity pressure signal $Pg$ is communicated to chamber 88 of the accumulator 80 via $Pg$ conduit 16, the acceleration valve 160 to be described hereinafter, a conduit 96, and a check valve 98. $Pg$ moves the diaphragm 86 of accumulator 80 leftwardly to store in the accumulator a volume of fluid at a pressure proportional to the average wheel speed. The accumulator 80 exhibits a nearly linear displacement of diaphragm 86 proportional to the wheel speed since $Pg$ is itself a nearly linear function of the average wheel speed. Thus diaphragm 86 velocity and the oil flow rate into the accumulator will be proportional to the wheel acceleration. Likewise, the diaphragm 86 velocity and the oil flow rate out of the accumulator will be proportional to wheel deceleration.

A deceleration orifice 128 bypasses check valve 98 to allow fluid return from accumulator 80 to the transmission governor during wheel deceleration. The fluid return path is from chamber 88 through deceleration orifice 128 into conduit 96 and through a check valve 130 to $Pg$ conduit 16 and the governor. The orifice 128 is selected to permit fluid flow therethrough at a flow rate corresponding to 1.5g wheel deceleration; a deceleration level slightly greater than that which a vehicle experiences during braking on the highest encountered road friction coefficient without attaining wheel slip in excess of that which provides a peak brake torque sustaining capability. Accordingly, when the vehicle wheels decelerate at a rate causing return of fluid from accumulator 80 to the governor at a rate less than the maximum flow rate through the deceleration orifice 128, the accumulator pressure, hereinafter referred to as $Pu$, will fall in synchronism with $Pg$. However, when the vehicle wheels decelerate at a rate causing $Pg$ to decrease at a rate in excess of the flow threshold of deceleration orifice 128, the deceleration orifice 128 restricts flow out of accumulator 128 causing $Pu$ to decrease at a lesser rate than the wheel speed pressure $Pg$. Thus it is seen that when excessive brake torque causes $Pg$ to decrease at a rate which $Pu$ cannot follow through deceleration orifice 128, $Pu$ becomes a gradually decreasing reference pressure equal to the optimum wheel speed profile. Thus the pressure differential between $Pu$ and the pressure in conduit 96, hereinafter referred to as $Pk$, is equivalent to the velocity differential between the optimum wheel velocity and the actual wheel velocity then existing. This pressure differential operates the control valve 100.

CONTROL VALVE

The control valve 100 includes a valve spool 102 sealingly slidable in a bore 104 of housing 82. Land 106 of spool 102 forms a wall of the accumulator chamber 88 and is normally urged into engagement of a stop surface 108 of the housing 82 by a spring 110. In this normal position of spool 102, a land 112 of spool 102 permits communication of transmission line pressure Pl in conduit 18 through an inlet port 114 of the control valve 100 while a land 116 of spool 102 opens a port 118 to communicate Pl to a conduit 120. The conduit 96 pressure Pk is communicated through a port 124 to the rightward end of valve spool 102. It will thus be seen that the spool 102 is normally pressure balanced by the equal pressures Pk and Pu acting on the ends thereof and is urged to the leftward position of FIG. 1 by spring 110. When the pressure differential between Pu and Pk exceeds the nominal preload of spring 110, equivalent to about 2 Psi, the control valve spool 102 moves rightwardly in proportion to the difference between the average wheel speed Pg or Pk and the reference speed pressure Pu. This movement of spool 102 is the integral of the relative wheel deceleration flow rate out of the accumulator 80. Rightward shifting of spool 102 in response to a wheel deceleration in excess of the orifice 128 threshold causes land 116 to block communication of Pl at inlet port 114 to port 118 and opens a flow path for modulator supporting pressure Pc from chamber 62 of modulator 28 through the hold valve 194, conduit 120, and control valve 100, to an outlet port 130 which is connected to an exhaust port 132 through the release accumulator 140, to be more fully described hereinafter. Modulator supporting oil in chamber 62 is thus exhausted and the brake release mode of the anti-lock cycle initiated.

The deceleration orifice 128 operates consistently at the designed 1.5g's flow rate since the rightward movement of spool 102 against spring 110 limits pressure Pu to provide a flow control unit that limits flow through the orifice to the designed rate.

RELEASE ACCUMULATOR

When control valve spool 102 moves rightward to initiate the brake release mode, Pc from modulator chamber 62 surges into the release accumulator 140. The release accumulator 140 includes a housing 142 having a bore 144 in which piston 146 is sealingly slidable. Piston 146 is urged to its rightward position shown in FIG. 1 by spring 148 and is displaced leftwardly as oil surges into accumulator chamber 150. Oil is discharged from accumulator chamber 150 through orifice 152 to the exhaust port 132, thus providing a controlled release of Pc from chamber 62 of the modulator 28, this relief of Pc from chamber 62 allows seating of modulator valve 42 to isolate the rear wheel brakes 20 and 22 from the master cylinder 24 and then decrease the pressure at the wheel brakes as plunger 46 is withdrawn to the right by the brake pressure acting on the end thereof in chamber 40. When the brake pressure is relieved sufficiently to reduce brake torque to a point below the torque sustainable by the wheel-to-road friction, wheel speed and the wheel speed pressure signal Pg begin to increase and recharge the accumulator 80.

ACCELERATION VALVE

Charging of the accumulator 80 with Pg is through the acceleration valve 160. Acceleration valve 160 includes a housing 162 having a bore 164 in which a valve spool 166 is sealingly slidable. A spring 168 urges valve spool 166 to its leftward most position engaging stop 170, as shown in FIG. 1. In this position land 172 blocks communication of Pg from inlet port 174 to the outlet port 176 which is connected to Pk conduit 96. A second land 180 of spool 166 blocks communication of Pl from inlet port 182 to outlet port 184 and communicates outlet port 184 to an exhaust port 185. Conduit 96 communicates Pk to the rightward end of spool 166 by a port 188 and assists the force of spring 168 in opposing rightward movement of spool 166 under the pressure force of Pg acting on the leftward end thereof. As the wheel speed pressure signal Pg increases during wheel acceleration, the Pk pressure force and spring 168 preload are overcome moving the spool 166 to the right. Pg inlet port 174 is thereby communicated to outlet port 176 which is connected through check valve 98 to the accumulator chamber 88 and the accumulator 80 is thereby recharged with Pg. Simultaneously the exhaust port 185 is blocked and the Pl inlet port 182 communicated to outlet port 184. The simultaneous communication of Pg to accumulator chamber 88 via check valve 98 and to the rightward end of spool 102 via port 124 pressure balances the control valve spool 102 allowing it to be shifted to its leftward position of FIG. 1 by spring 110. This re-establishes communication of Pl at control valve inlet port 114 to control valve outlet port 118. The preload of spring 110 returns valve spool 102 to its leftward position of FIG. 1, slightly before the wheel speed pressure Pg recovers to the reference pressure Pu.

HOLD VALVE

The hold valve 194 includes a housing 196 having a bore 198 in which a valve spool 202 is sealingly slidable. Spool 202 is urged to its leftward position of FIG. 1 by a spring 204. At this leftward position a port 206 connected to control valve 100 by conduit 120 is communicated to port 208 which is connected to modulator chamber 62 by conduit 210. Acceleration valve outlet port 184 is connected to an inlet port 212 at the leftward end of hold valve spool 202 and consequently when spool 166 of acceleration valve 160 is in its rightward position during charging of accumulator 80, Pl at port 182 is communicated to the leftward end of hold valve spool 202 causing it to shift rightwardly and block communication modulator chamber 62 and the control valve 100. The Pc in modulator chamber 62 is thereby held constant at its then existing magnitude to provide the hold mode of the anti-lock cycle during which the wheel continues to accelerate.

The hold valve remains in its rightward position holding the pressure Pc in modulator chamber 62 and preventing communication of Pl thereto as long as the wheel speed or Pg continues to increase. When Pg stops increasing the spring 168 returns acceleration valve spool 166 to the leftward position exhausting Pl from the leftward end of hold valve spool 202 through the exhaust port 185. Spring 204 can then move hold valve 202 leftwardly to reestablish communication of Pl through control valve 100 and hold valve 194 to move plunger 46 forcibly leftwardly to re-apply pressure at the wheel brakes and open the check valve 42 and reestablish communication between the master cylinder and rear wheel brakes. This re-application of Pl to chamber 62 to increase the brake pressure is at a controlled rate through an apply orifice 220 in Pl conduit 18.

SYSTEM OPERATION

Engine Start

When the engine is started the transmission 14 input shaft drives the transmission pump generating a pressure Pl communicated to the chamber 68 of modulator 28 via conduit 18. Piston 66 is thereby moved rightwardly, carrying flanged cup 50 out of engagement with the collar 48 on modulator plunger 46. Simultaneously, Pl is communicated through control valve 100 to conduit 120 and through hold valve 194 to Pc chamber 62 of the modulator 28. Pc in chamber 62 acts upon diaphragm 60 to hold plunger 46 in its leftward position of FIG. 1 wherein modulator valve 42 is open to permit free brake fluid communication between master cylinder 24 and rear wheel brakes 20 and 22.

VEHICLE ACCELERATION

As the vehicle is driven, average wheel speed pressure signal Pg is generated by the transmission governor and communicated through conduit 16. At wheel acceleration rates in excess of a threshold level of approximately 0.5g, as determined by the preload of acceleration valve spring 168, Pg is communicated through the acceleration valve 160 to Pk conduit 96. Pk thus equals Pg and is communicated through check valve 98 to chamber 88 of the accumulator 80. A volume of fluid proportional to the average wheel speed is stored in the accumulator 80 at pressure Pu equal to Pg and Pk. Simultaneously Pg is communicated to the rightward end of control valve spool 102 to pressure balance the control valve spool and permit spring 110 to hold it in its leftward position of FIG. 1. It should be noted that when the accumulator 80 is being charged through the acceleration valve 160, the acceleration valve communicated Pl to hold valve 194 causing rightward shifting of hold valve spool 202 consequent isolation of the modulator chamber 62 from the control valve 100. A Pc equal to Pl is thereby maintained in chamber 62 and plunger 46 is held in its normal leftward position unseating modulator valve 42.

During wheel deceleration the wheel speed decreases and thus Pg decreases. It has been determined that a 1.5g threshold of deceleration orifice 128 corresponds to a wheel deceleration slightly in excess of the maximum deceleration obtainable on the highest wheel-to-road friction co-efficient surface encountered in vehicle braking. At wheel decelerations of less than 1.5g's the deceleration orifice 128 accommodates the flow out of accumulator 80 so that the accumulator pressure Pu falls in synchronism with Pk and Pg. Pu in accumulator chamber 88 and Pk acting on the rightward end of control valve spool 102 provide balanced opposing forces on the control valve spool 102 and consequently spring 110 holds the valve spool 102 in its leftward position wherein Pl is communicated to Pc chamber 62 of modulator 28.

VEHICLE WHEEL DECELERATION IN EXCESS OF 1.5g's

When excess braking pressure from master cylinder 24 is applied to the wheel brakes, a brake torque results which is in excess of the torque which the wheel-to-road friction can sustain and excessive wheel slip will be encountered and the anti-lock cycle is initiated.

Figure 2:
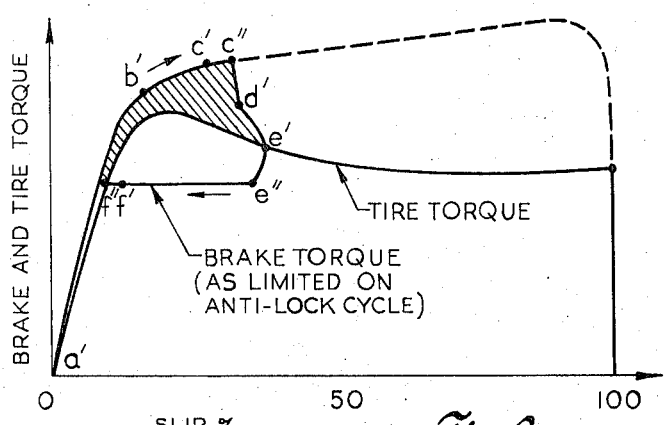
FIG. 2 is a plot of brake and tire torque versus wheel slip.
Figure 3:
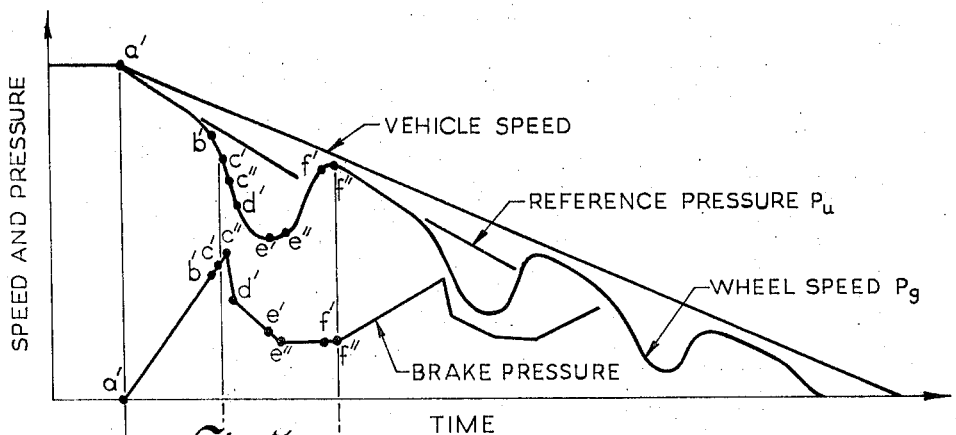
FIG. 3 is a plot of speed and brake pressure versus time.
Figure 4:
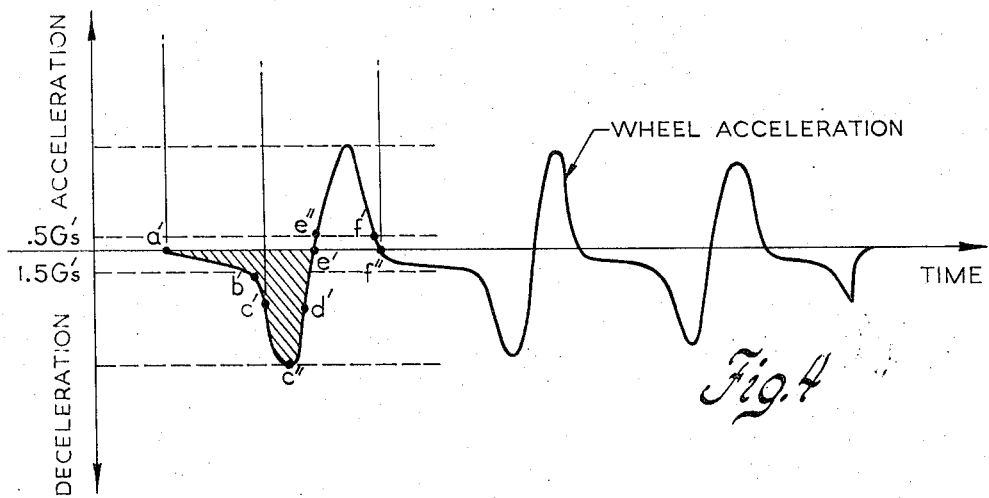
FIG. 4 is a plot of wheel acceleration and deceleration versus time.

For an understanding of the operation of the anti-lock system, reference will be had to FIGS. 2, 3, and 4. FIG. 2 is a plot of brake and tire torque versus wheel slip. As the driver actuates the master cylinder, brake pressure causes the brake torque to increase from point $a'$ of FIG. 2. The brake torque causes a decrease in wheel speed, and thus a decrease in Pg as seen in the plot of speed and brake pressure versus time of FIG. 3. The velocity difference between the vehicle and the wheel, commonly known as wheel slip, increases with brake torque and generates an increasing tire torque which decelerates the vehicle as shown in FIG. 4, a plot of wheel acceleration and deceleration versus time. As brake pressure (FIG. 3) is increased beyond point $b'$, a substantial difference begins to develop between the brake and tire torques, and thus between the wheel speed and vehicle speed. If the brake torque is permitted to increase unchecked along the dashed line of FIG. 2, the wheel rapidly approaches the locked or 100 percent slip condition at which the vehicle is decelerated by a tire torque considerably less than that available at the peak of the tire torque curve, and accordingly, at a vehicle deceleration rate less than the maximum. The flow rate of oil out of the accumulator 80 as wheel speed and thus Pg decrease is proportional to the wheel deceleration. When the wheel deceleration exceeds the 1.5g equivalent flow rate threshold of deceleration orifice 128, at approximately point $b'$, on the respective plots, Pg and thus Pk decrease faster than flow out of the accumulator and pressure Pu is able to follow through deceleration orifice 128. The resulting pressure differential between Pu and Pk occuring across deceleration orifice 128 is applied as well across the spool 102 of the control valve 100. When this differential between Pu and Pk exceeds the preload of spring 110, control valve spool 102 is shifted rightwardly to initiate the release mode of the anti-lock cycle. The flow rate of fluid permitted out of the accumulator through the deceleration orifice 128 as wheel speed and Pg decreases is proportional to the maximum wheel deceleration obtainable on the highest wheel-to-road friction co-efficient surface encountered in vehicle braking. The rate at which Pg and Pk decrease is proportional to the actual wheel deceleration occurring during braking. The motion of control valve spool 102 by the Pu–Pk pressure differential is the integral of the relative wheel acceleration flow rates; the control valve spool displacement is thus proportional to the relative wheel velocity. Rightward shifting of control valve spool 102 occurs in the 2 to 4 MPH relative velocity range and blocks communication of Pl to the hold valve 194 and modulator chamber 28 and opens communication of Pc to release accumulator 140. Pc in modulator chamber 62 surges through hold valve 194 and control valve 100 into the release accumulator 140. The surge of fluid is stored in the release accumulator and exhausted therefrom through release orifice 152 to provide a controlled release of Pc from the modulator 28 to thus control the rate at which the plunger 46 is withdrawn to close modulator valve 42 and decrease the pressure at wheel brakes 20 and 22. Such movement of control valve spool 102 begins at point $c'$ on the respective plots and after an inherent delay, the brake pressure decrease is effected at $c''$.

The release of brake pressure permits the wheel to begin accelerating to point $d'$ and then at a slower rate to point $e'$ at which the wheel stops decelerating and begins to accelerate. At point $e''$, the increasing Pg during the wheel acceleration reaches the 0.5g threshold of acceleration valve 160 and shifts spool 166 thereof rightwardly to open communication of Pg to Pk conduit 96 and begin recharging the accumulator 80.

The rightward shifting of acceleration valve 160 also opens communication of P1 to the hold valve 194, thereby shifting spool 202 of hold valve 194 rightwardly to close communication of the modulator chamber 62 to the control valve 100 and hold the then existing Pc in modulator chamber 62. As the accumulator 80 is recharged with Pg, the pressure differential between Pu and Pk is diminished and spring 110 moves the spool 102 at control valve 100 to its leftward position to re-establish communication of P1 to the hold valve 194. The hold valve 194 remains closed while the wheel speed continues to recover. When the wheel acceleration falls below 0.5g at point $f'$, indicating that the wheel speed is approaching the vehicle speed, spring 168 shifts spool 166 leftwardly and the pressure at the left end of hold valve spool 202 is exhausted through exhaust port 185. Spring 204 then shifts hold valve spool 202 leftwardly and P1 at the control valve is metered into the chamber 62 of the modulator 28 through control orifice 220 to move plunger 46 leftwardly and thereby increase the brake pressure from point $f''$ and reapply the brakes 20 and 22.

The anti-lock control system then repeats this release, hold and reapply cycle until the vehicle is brought to a stop or the excessive brake actuation by the vehicle operator is released.

What is claimed is:

1. An anti-lock brake system comprising; a brake pressure modulating means, governor means driven at wheel speed and providing fluid at pressure proportional to wheel speed and a flow rate proportional to wheel acceleration and deceleration, accumulator means, valve means communicating wheel speed proportional pressure fluid to the accumulator means during wheel acceleration to charge the accumulator means, orifice means discharging pressure fluid from the accumulator means to the governor during wheel deceleration at a predetermined maximum fluid flow rate to provide a differential between wheel speed proportional pressure and accumulator pressure during wheel deceleration at a level causing a fluid flow rate exceeding the flow threshold of the orifice means, and control means operably by the differential between wheel speed proportional pressure and accumulator pressure to control the brake pressure modulating means.

2. An anti-lock brake system comprising; brake pressure modulating means, means driven at wheel speed and providing fluid flow in one direction therethrough during wheel acceleration at a flow rate proportional to the rate of acceleration and in the other direction therethrough during wheel deceleration and at a flow rate proportional to the rate of deceleration, accumulator means, valve means communicating fluid from the means driven at wheel speed to the accumulator means during wheel acceleration to charge the accumulator means, orifice means returning fluid from the accumulator means to the means driven at wheel speed during wheel deceleration, and control means operable by a pressure differential across the orifice means to control the brake pressure modulating means, the orifice means restricting flow therethrough to a rate corresponding to a predetermined wheel deceleration rate whereby upon wheel deceleration in excess of the predetermined rate a pressure differential results across the orifice means to operate the control means.

3. An anti-lock brake system comprising; brake pressure modulating means, governor means driven at wheel speed and providing fluid at a pressure proportional to wheel speed and a flow rate proportional to wheel acceleration, accumulator means, check valve means communicating wheel speed proportional fluid to the accumulator means during wheel acceleration to charge the accumulator means, orifice means discharging pressure fluid from the accumulator means to the governor means during wheel deceleration and restricting flow to a predetermined maximum fluid flow rate corresponding to the known maximum rate of permissible wheel deceleration without wheel lock-up, control means operable by the differential between wheel speed proportional pressure and accumulator pressure to control the brake pressure modulating means as a function of the magnitude of said differential, and circuit means effective during wheel acceleration above a predetermined level to isolate the control means from the brake pressure modulating means to maintain the brake pressure modulating means at its then existing condition.

4. An anti-lock brake system comprising; brake pressure modulating means, governor means driven at wheel speed and providing fluid at a pressure proportional to wheel speed and a flow rate proportional to wheel acceleration, accumulator means, check valve means communicating wheel speed proportional pressure fluid to the accumulator means during wheel acceleration to charge the accumulator means, orifice means discharging pressure fluid from the accumulator means during wheel deceleration at a rate not exceeding a predetermined fluid flow rate corresponding to the known maximum optimum rate of permissible wheel deceleration without wheel lock-up, control valve means operably by the differential between wheel speed proportional pressure and accumulator pressure to control the brake pressure modulating means, hold valve means effective when actuated to isolate the control valve means from the brake pressure modulating means to maintain the brake pressure modulating means at its then existing condition, and acceleration sensing valve means operable during wheel acceleration above a predetermined level to actuate the hold valve means.

* * * * *